US009290280B2

(12) United States Patent
Moretti

(10) Patent No.: US 9,290,280 B2
(45) Date of Patent: Mar. 22, 2016

(54) METHOD FOR PRODUCING A CONTAINER INTENDED TO CONTAIN A SUBSTANCE TO BE DISPENSED BY AN AIRLESS PUMP, AND A CONTAINER PRODUCED BY THE METHOD

(71) Applicant: LUMSON S.p.A., Capergnanica (CR) (IT)

(72) Inventor: Matteo Moretti, Crema (IT)

(73) Assignee: LUMSON S.P.A., Capergnanica (CR) (IT)

( * ) Notice: Subject to any disclaimer, the term of this patent is extended or adjusted under 35 U.S.C. 154(b) by 28 days.

(21) Appl. No.: 13/951,224

(22) Filed: Jul. 25, 2013

(65) Prior Publication Data

US 2014/0033648 A1    Feb. 6, 2014

(30) Foreign Application Priority Data

Jul. 31, 2012  (IT) .............................. MI2012A1346

(51) Int. Cl.
| | |
|---|---|
| *B65B 3/18* | (2006.01) |
| *B65D 1/02* | (2006.01) |
| *B29C 63/26* | (2006.01) |
| *B65D 83/00* | (2006.01) |

(52) U.S. Cl.
CPC . *B65B 3/18* (2013.01); *B29C 63/26* (2013.01); *B65D 1/0292* (2013.01); *B65D 83/0055* (2013.01)

(58) Field of Classification Search
CPC ..... B65D 1/0292; B65D 83/0055; B65B 3/18
USPC .......................................... 222/95, 105, 107
See application file for complete search history.

(56) References Cited

U.S. PATENT DOCUMENTS

| | | | | | |
|---|---|---|---|---|---|
| 3,288,334 | A | * | 11/1966 | Corsette ......................... | 222/107 |
| 3,979,025 | A | * | 9/1976 | Friedrich .............. | B65D 83/62 |
| | | | | | 222/95 |
| 5,262,765 | A | * | 11/1993 | Tsumura .............. | G06T 13/205 |
| | | | | | 345/473 |
| 5,622,282 | A | * | 4/1997 | Yazawa et al. .................. | 222/95 |
| 5,915,595 | A | * | 6/1999 | Dow ..................... | B65D 83/62 |
| | | | | | 222/105 |
| 6,439,430 | B1 | * | 8/2002 | Gilroy, Sr. ........... | B65D 31/003 |
| | | | | | 222/105 |

(Continued)

FOREIGN PATENT DOCUMENTS

| | | |
|---|---|---|
| EP | 2243557 A1 | 10/2010 |
| EP | 2366529 A1 | 9/2011 |

(Continued)

OTHER PUBLICATIONS

EP Search Report of Apr. 24, 2013 for Italian Patent Application No. MI 2012A 001346 to LUMSON S.p.A. filed Jul. 31, 2012.

(Continued)

*Primary Examiner* — Daniel R Shearer
(74) *Attorney, Agent, or Firm* — Vorys, Sater, Seymour and Pease LLP

(57) ABSTRACT

A method for producing a container intended to contain a substance to be dispensed by an airless pump, having an external body inside which a bag is provided formed of thermoplastic material, the bag presenting, at least at a connection surface between its neck and its lateral surface, controlled deformation zones arranged to guide the bag deformation in accordance with preferential directions. The invention also relates to a container formed by the described method and a bag with the aforedescribed characteristics.

18 Claims, 6 Drawing Sheets

(56) References Cited

U.S. PATENT DOCUMENTS

| | | | |
|---|---|---|---|
| 2004/0084477 A1* | 5/2004 | Albaum | B65D 83/62 222/95 |
| 2006/0124663 A1* | 6/2006 | Salemme | B65D 83/62 222/95 |
| 2007/0145079 A1* | 6/2007 | Casamento | B65D 83/38 222/386.5 |
| 2007/0241131 A1* | 10/2007 | Smith et al. | 222/95 |
| 2009/0270830 A1* | 10/2009 | Sano et al. | 604/403 |
| 2010/0044393 A1* | 2/2010 | Moretti | 222/95 |
| 2010/0264166 A1 | 10/2010 | Moretti | |
| 2011/0210148 A1 | 9/2011 | Nelson et al. | |
| 2011/0227258 A1 | 9/2011 | Patrini | |
| 2012/0267388 A1 | 10/2012 | Tom et al. | |

FOREIGN PATENT DOCUMENTS

| | | |
|---|---|---|
| WO | 2011006146 A9 | 1/2011 |
| WO | 2012051496 A9 | 4/2012 |

OTHER PUBLICATIONS

Italian patent application No. MI2009A000649, to Moretti, filed Apr. 20, 2009 (with Abstract of corresponding EP2243557A1).

* cited by examiner

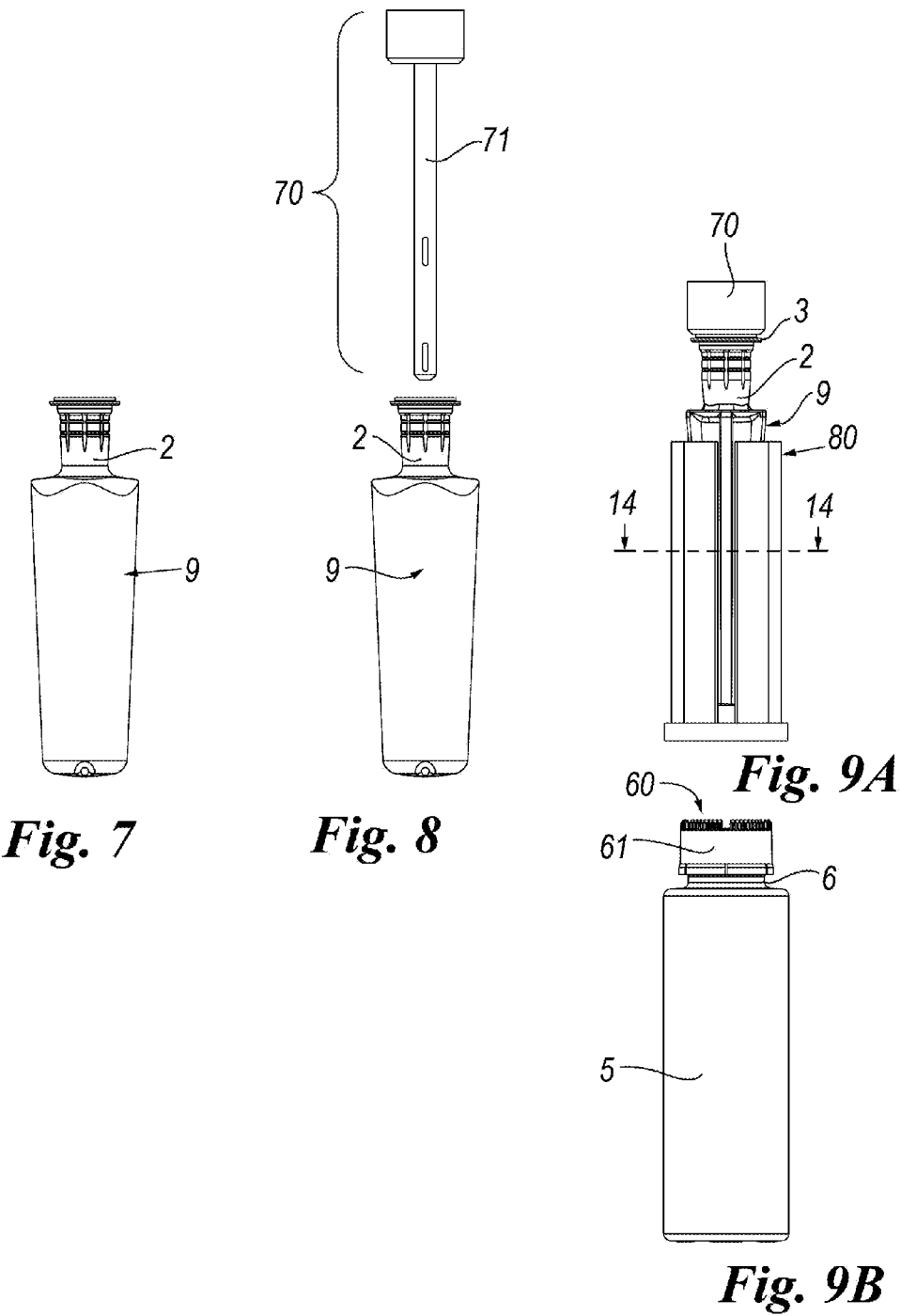

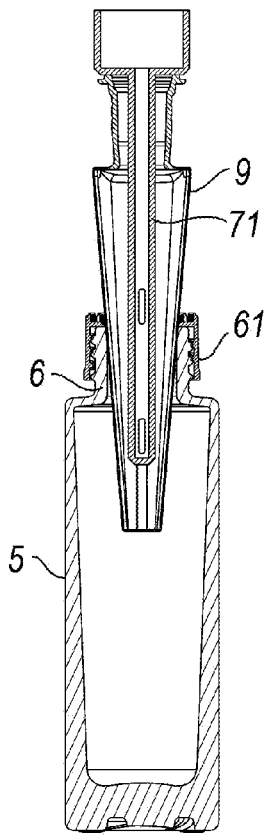
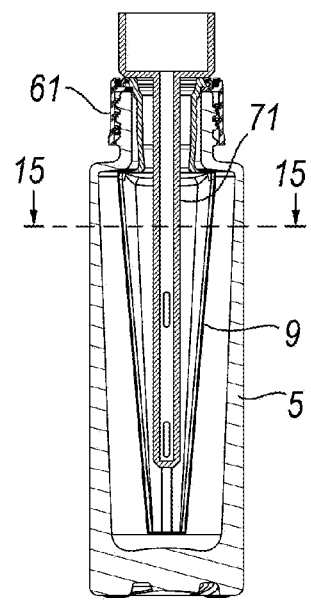
*Fig. 10*  *Fig. 11*
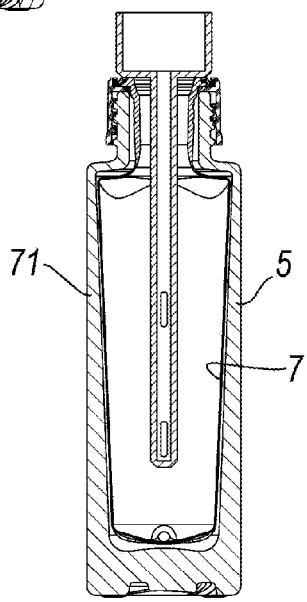
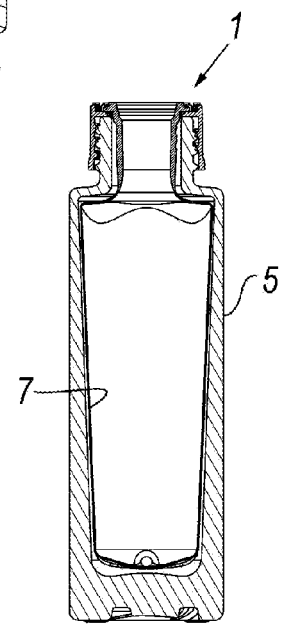
*Fig. 12*  *Fig. 13*

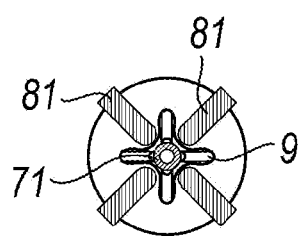
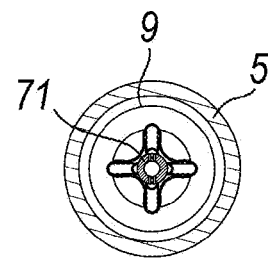
*Fig. 14*  *Fig. 15*
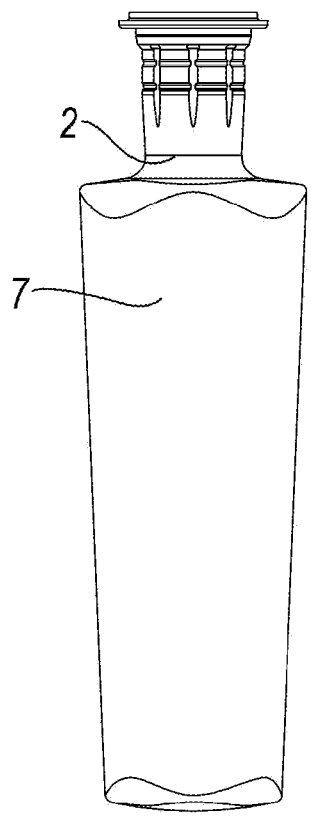
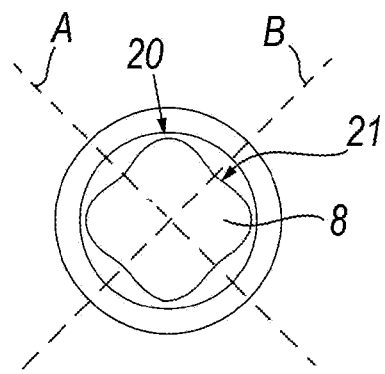
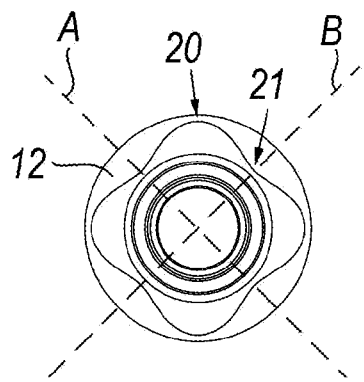
*Fig. 16*  *Fig. 17*  *Fig. 18*

METHOD FOR PRODUCING A CONTAINER INTENDED TO CONTAIN A SUBSTANCE TO BE DISPENSED BY AN AIRLESS PUMP, AND A CONTAINER PRODUCED BY THE METHOD

CROSS-REFERENCE TO RELATED APPLICATION

This claims the benefit under 35 USC Section 119 of Italian patent application no. MI2012A001346 filed 31 Jul. 2012.

FIELD OF THE INVENTION

The present invention relates to a method for producing a container intended to contain a substance to be dispensed by an airless pump, and a container produced by the method.

INVENTION BACKGROUND

Various methods are known for producing containers associable with airless pumps, such as that described in patent application EP2366529 (A1), in the name of the same applicant.

The known methods consist of blow-moulding a preform of polymer material, heated to its softening point, directly in the interior of a hollow body, such as to cause said preform to assume the shape of the hollow body interior. Essentially, this preform is transformed into a deformable bag formed in the hollow body interior.

An airless pump is sealedly associated with the bag after the bag inside the hollow body has been filled with a fluid to be dispensed.

During dispensing by the pump, the bag inside the container gradually deforms as the product is dispensed; in fact, the prerogative of airless pumps is precisely that they do not enable air to enter the bag from the surrounding atmosphere to replace the product dispensed. Hence at each dispensing operation, the bag slightly contracts. In this manner, the product does not enter into contact with air withdrawn from the atmosphere, hence remaining isolated.

In other words, product dispensing causes squeezing of the bag, as the airless pump prevents external air from entering the bag. The result is that the bag inside the hollow body is gradually squeezed onto itself as the product is dispensed.

Current production methods offer considerable advantages in terms of performance and appearance as the bag is formed directly within the external body in which it is to be housed.

However these methods are fairly costly and require process times and optimizations which can be implemented only for high range lines, intended for very costly products.

SUMMARY OF THE INVENTION

An object of the invention is to provide a method for producing a container intended to contain a substance to be dispensed by an airless pump, which is less costly and easier to implement and optimise than traditional methods.

BRIEF DESCRIPTION OF THE DRAWINGS

Further characteristics and advantages of the invention will be apparent from the description of a preferred but non-exclusive embodiment of the method, illustrated by way of non-limiting example in the accompanying drawings, in which:

FIG. 7 is a reduced view of FIG. 1;

FIGS. 8, 9A and 9B are simplified lateral views showing some initial steps of the method of the present invention;

FIGS. 10, 11, 12 and 13 are lateral views showing some subsequent steps in the method of the present invention;

FIGS. 14 and 15 are sections taken respectively on the lines 14-14 and 15-15 of FIGS. 9A and 11;

FIGS. 16, 17 and 18 show respectively a lateral view, a view from below and a plan view of a second embodiment of the bag forming a part of the container of the present invention;

DETAILED DESCRIPTION OF THE PREFERRED EMBODIMENTS

Figure 1:
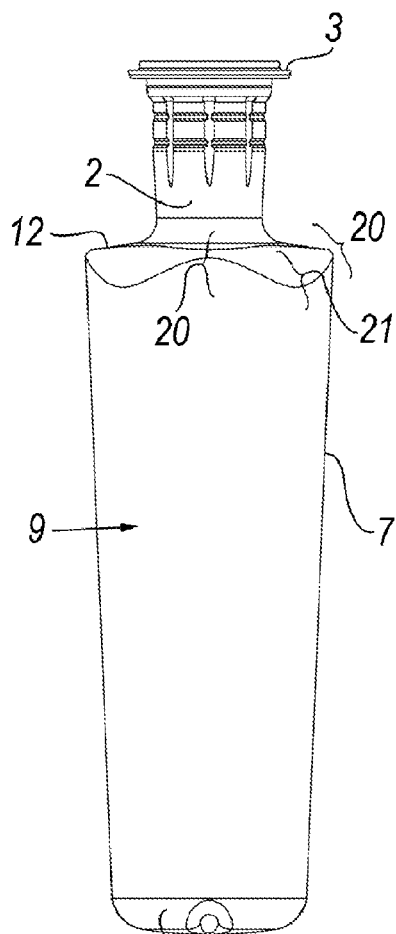
FIGS. 1, 2 and 3 show respectively a lateral view, a view from below and a plan view of a bag forming a part of the container of the present invention.

With reference to said figures, these show a container associable with an airless pump, indicated overall by the reference numeral 1.

The container is intended to contain a substance to be dispensed by an airless pump and comprises a substantially rigid external body 5, in the interior of which a bag 9 is provided made of thermoplastic material. The bag is provided with a neck 2 from which, at an upper end (in FIG. 1), there projects a flange 3. This neck is connected, at the opposite end to the flange 3, to a lateral surface 7 of the bag. The lateral surface 7 is closed by a bottom 8.

The bag 9 shown in FIG. 1 is formed preferably by the blow extrusion method. In this manner it presents all the shape and dimension attributes required for its operation inside the rigid bottle.

It is formed in the interior of a die which presents substantially the same shape and dimensions as the cavity of the external body into which the bag 9 is intended to be inserted. The external body 5 can be made by various methods. If it is constructed of glass, for example by blow-moulding, the internal cavity may not have perfectly identical dimensions for each product made. Hence the internal bag will have a shape very similar to that of the internal cavity but will evidently not be perfectly identical. The external shape of the bag is hence only substantially the same as the internal cavity of the external body 5.

Figure 4:
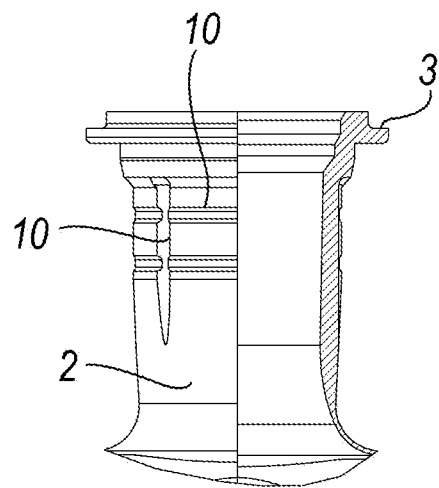
FIG. 4 is a simplified partly sectional enlarged view of a part of the neck of the bag of FIG. 1.

It should be noted that the bag 9, being made preferably by blow-moulding, is formed in one piece. Of course the bag can also be realized with other methods, and also not in one piece, but in different parts As can be seen from FIG. 4, in its external zone the bag neck 2 presents grooves 10, some of circular configuration and some of vertical axial extension relative to the bottle mouth.

These grooves are used to enable air to pass between the external body 5 and the bag both during the bag insertion step and during the operation of the airless system.

These grooves are also necessary to enable the container to be formed during the blow extrusion step. The grooves enable the neck to assume the correct shape and be constrained to the mould so that it does not undergo tearing during the blow-moulding.

According to the present invention, the bag presents, at least on a lateral surface (i.e. on a shoulder 12), controlled deformation zones 20, 21 adapted to guide the deformation of the bag, when inside it, in preferential directions as the air is extracted from its interior by suitable equipment, in order to deform it.

This deformation is necessary to enable the bag to be inserted into the external body 5 through its mouth.

Figure 5:
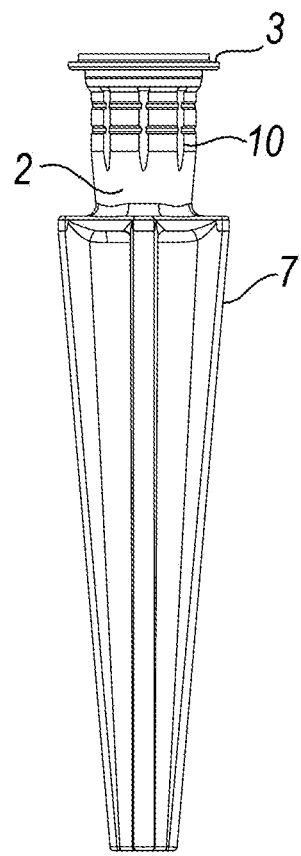
FIG. 5 and FIG. 6 are respectively a lateral view and a view from below of the bag of FIG. 1, squeezed onto itself as a result of the air being withdrawn from its interior.
Figure 6:
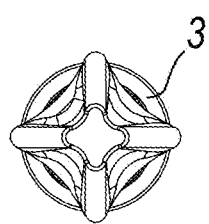

According to that embodiment of the bag shown in FIGS. 1-4 (not deformed) and in FIGS. 5-6 (deformed, to be inserted into the body 5 through its mouth), the controlled deformation zones have different radii of curvature.

Figure 3:
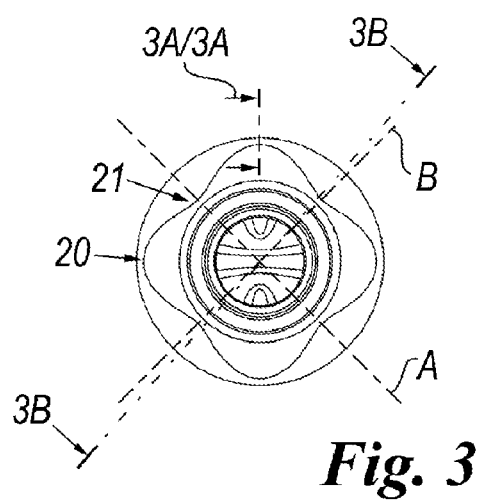
Figure 3A:
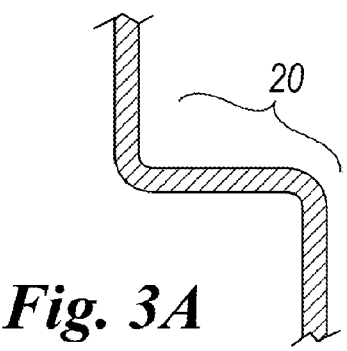
FIGS. 3A and 3B are simplified sections taken on the lines 3A-3A and 3B-3B respectively of FIG. 3.
Figure 3B:
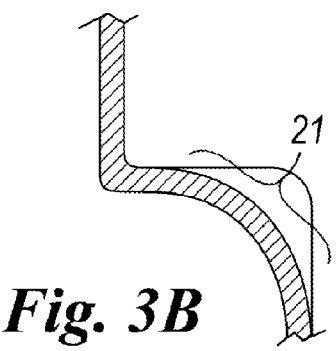

First controlled deformation zones 20 are provided between the shoulder 12 and the lateral surface 7 of the bag (see the section of FIG. 3A), while second deformation zones 21 are provided between the neck 2 and the lateral surface 7 of the bag (see the section of FIG. 3B). The first zones 20 essentially present lesser radii of curvature, providing greater strength to the zone in which they are provided. The second curvature zones 20 present more rounded and softer radii of curvature, hence giving greater deformability to the zone concerned.

As can be seen, first deformation zones alternate with second deformation zones. Essentially, in the described embodiment, four first controlled deformation zones 20 and four second controlled deformation zones 21 are provided. They are disposed spaced apart by an angular distance of 45°.

Essentially, the controlled deformation zones guide the bag deformation in preferential directions. In the described embodiment, these preferential directions pertain to planes A, B which pass through the bag axis and through the greater radius of curvature zones. The bag deforms along two bag-containing planes A, B substantially disposed at 90 degrees to each other which cross on the bag axis.

It should be noted that the bag of FIG. 1 comprises on its bottom 8, further controlled deformation zones arranged to guide the deformation of this latter in further preferential directions.

In the described embodiment, these further controlled deformation zones comprise depressions or recesses in the bag surface. These are disposed both on the bottom and on a connection surface between the bottom and the bag lateral surface 7. In particular, first further controlled deformation zones 32 are provided consisting of a depression which extends on the bottom along a diameter thereof.

Second further controlled deformation zones 31 are also provided in which the depressions again extend diametrically but concern only an interface portion between the bottom 8 and the lateral surface 7 of the bag.

These further controlled deformation zones also guide the bag deformation along preferential directions, which are preferably the same as those of the controlled deformation zones provided in the upper part of the bag. The deformation planes will hence be the same, i.e. those indicated by A and B.

The preferential directions pertain to said planes A, B, which pass through the bag longitudinal axis L and through a point angularly intermediate between the further controlled deformation zones 31 and 32.

Hence as already stated, in the embodiment of FIGS. 1 and 6, the controlled deformation zones are defined by variations in the connection radius of the connecting wall between said neck and said lateral surface, or between said bottom and said lateral surface, said preferential deformation planes containing the points of greater connection radius.

FIGS. 16, 17 and 18 show a further embodiment in which the particular connection radii used for the bag shoulders are also repeated on the bottom, to form the further controlled deformation zones.

Figure 19:
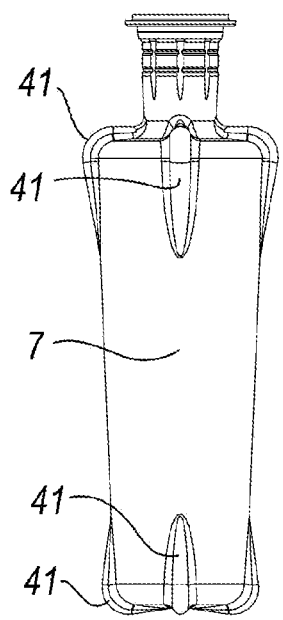
FIGS. 19, 20 and 21 show respectively a lateral view, a view from below and a plan view of a third embodiment of the bag forming a part of the container of the present invention.
Figure 20:
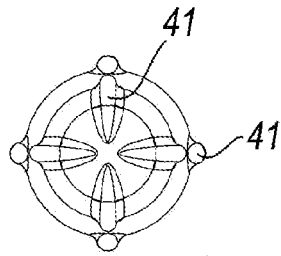
Figure 21:
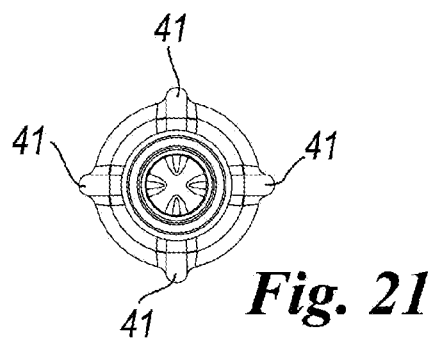

FIGS. 19, 20 and 21 show controlled deformation zones 41 (on the shoulder 12) and further controlled deformation zones 41 (on the bottom) which instead of being in the form of depressions (as on the bottom of the first embodiment) are formed by protuberances. These have the same characteristics and positionings as the preceding and function conceptually in the same manner, facilitating the creation of controlled deformation planes A, B.

Figure 22:
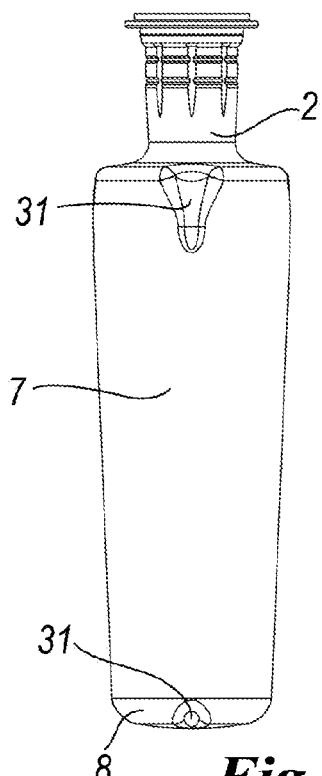
FIGS. 22, 23 and 24 show respectively a lateral view, a view from below and a plan view of a fourth embodiment of the bag forming a part of the container of the present invention.
Figure 23:
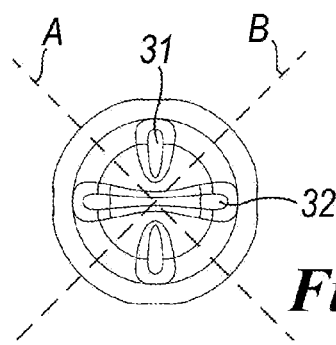
Figure 24:
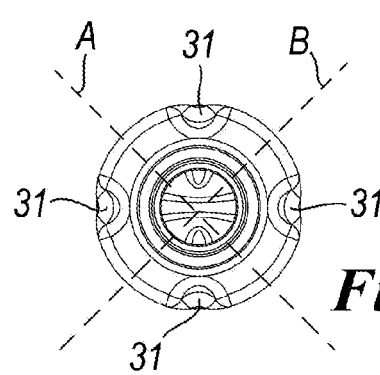

FIGS. 22-24 show a further embodiment in which the first controlled deformation zones are defined by depressions or recesses totally similar to those already described in the first embodiment and present on its bottom.

In this case, given the presence of the neck, these depressions extend slightly beyond the connection surface between the shoulder 12 and the lateral surface 7 of the bag, they extending axially on the lateral surface.

Figure 2:
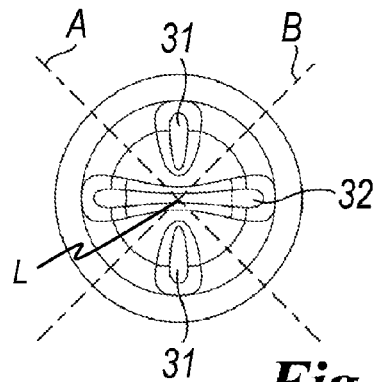

The bottom of this embodiment is totally identical to that shown in FIG. 2, and hence will not be further described. The preferential deformation planes formed by the presence of the depressions shown thereon are also disposed as the preceding. They are indicated by A and B in the figures.

It should be noted that various ways of forming the controlled deformation zones have been shown, they also being applicable using a different material thickness.

Any combination of programmed deformation zones can be used on the bottom, on the shoulder or on the lateral surface. Hence for example, depressions can be used for the shoulder and protuberances for the bottom, or any other combination of these means.

Controlled deformation zones can also be provided angularly disposed in a different manner. For example they can be three in number, disposed at 120 degrees apart. In that case the bag, on deforming, will no longer form a cross, but instead will lie along the bisector of the angles of an equilateral triangle, with three preferential deformation planes offset by 60° from the position of the controlled deformation zones.

Any other configuration or arrangement of the controlled deformation zones can in any event be provided. Hence the controlled deformation zones or said further controlled deformation zones can be defined by:

- radial depressions incorporated into the connection surface between said lateral surface and the neck, said preferential deformation planes being external to said depressions,
- protuberances which project from the connection surface between said lateral surface and the neck, said preferential deformation planes being external to said protuberances,
- variations in the connection radius of the connecting wall between said neck and said lateral surface, or between said bottom and said lateral surface, said preferential deformation planes containing the points of greater connection radius,
- or any combination thereof.

The invention also relates to a method for producing a container intended to contain a substance to be dispensed by an airless pump, wherein a substantially rigid body 5, having a neck 6 defining an access opening 60 to the body cavity is prepared, together with a bag formed in accordance with any of the aforedescribed embodiments.

Advantageously an axially holed ring cap 61 is screwed onto the rigid external body 6, and against which the flange 3 of the bag 9 is intended to abut.

This ring cap and its function are described in patent application IT-MI2009A000649 filed in the name of the same applicant, which is deemed to be incorporated in the present text for reference.

In a step shown in FIG. 8, a probe 70 is sealedly coupled to the bag 9 via its neck (and possibly the flange), to withdraw the air contained in the bag and cause a vacuum in this latter, which hence contracts. It assumes the configuration shown in FIG. 5 and visible in the sectional view of FIG. 10.

Advantageously the probe comprises a stem 71 which is inserted into the bag at least during the air extraction and/or inflation operations, such that at least when the bag is contracted, this stem is maintained elongated to facilitate its insertion into the external body 5.

Before withdrawing the air contained in the bag, this latter is inserted into a gripper which is external to the container and provided with movable jaws which extend and can be moved precisely along said main planes. These partially deform the bag to guide the contraction process while the air is being withdrawn to create a vacuum. The gripper jaws can be fixed or movable.

The bag is then extracted by the gripper while maintaining the vacuum and, and while still maintaining the vacuum, the bag is inserted into the external body as shown in FIG. 10.

When the flange abuts against a part of said body 5, namely against the ring cap 61 if present, air is fed into the bag. This air jet inflates it and presses it against the inner walls of the body 5. The pressure required to inflate the bag can range from 1 to 10 bar.

The bag can be inflated by using a hot air flow to facilitate shaping of the bag inside the rigid bottle.

In conclusion, the air present between the contracted bag and the container is pushed out by the expansion of the bag and passes through the already described grooves 10, present in all embodiments.

The probe is then extracted and the container is ready to be filled and associated with the airless pump.

An alternative method of returning the bag to shape is to withdraw the air between the walls defining the cavity of the rigid body 5 and the collapsed bag.

Once the bag has been inserted into the rigid body the vacuum produced via the probe is interrupted and, using suitably devised means, for example sealedly associable with the bottle neck, the air present outside the bag but inside the cavity of the rigid body is drawn out through the recesses present on the bag neck and on the ring cap 61.

Various embodiments have been described regarding a bag according to the present invention and a method for producing a container having an external body in which a bag according to the present invention is inserted, however others can be conceived by utilizing the same inventive concept.

It should be noted that by using blow extrusion technology, the bag can be made from various material families, such as PP—PE—PA—SURLYN—ORGALLOY—EVOH—ALUMINIUM.

The bag can also be obtained with known techniques, different from blow moulding. It also can be realized in multilayer material, consisting of a combination of layers of the aforesaid materials.

This material combination enables the mechanical properties of the first material to be combined with the chemical or permeability resistance properties of the second material, as already used for example in preserving sauces (such as mayonnaise or tomato sauce).

It should also be noted that the bag as described is formed by blow-moulding a preform made of a thermoplastic material, preferably from those listed. However the bag could also be made by joining together two or more pieces, such as the body and neck.

The body could be made for example by a traditional technique and the neck by injection moulded, to be then fitted by bonding or welding.

This solution could permit variants currently not displayed.

As already discussed the bag having substantially the shape of the internal cavity of the rigid body, is provided with a neck having a flange 3 projecting radially from one end thereof, the neck, at that end opposite the end at which the flange is present, being connected to a lateral surface of the bag. The lateral surface comprises a closure bottom. The neck can have substantially an outer shape that is mainly cylindrical, or it can have a conical shape. Preferably the section of the neck have a lower area at the joining part between the neck and the lateral surface of the bag, than at the joining area between the neck and the flange.

Therefore the outer shape of the neck is tapered from the flange to the lateral surface of the bag.

This allows a better outflow of the air trapped between the body and the bag during the bag inflation; it also helps the insertion of the bag in the outer body 5.

It is to be noted that before inserting the bag in the opening 60 of the body 5, the bag (and in certain cases also the body 5) can be oriented. This step is particularly useful when the internal cavity have a shape that is not circular, for example with square, rectangular or elliptic plant. In order to correctly orient the bag with respect to body, a mechanical or optical search can be done on the pieces, in order to find reference points realized on the bag or on the body (or on both). Those reference points can be realized expressly on the bag and the body, or can be reference points provided also for other scopes, for example for aesthetical functions.

It is finally to be noted a container realized with the present method, do not show contact signs between the bag and the surface of the internal cavity, this giving a better aesthetical appearance if compared to a bag directly moulded in the cavity of the body. Furthermore the extraction of the empty bag from the body, it is more simple as the bag never adheres to the outer body. Therefore in this case it is not necessary to use lubricating substances to allow a more comfortable extraction of the bag from the body 5.

The invention claimed is:

1. A container for containing a substance to be dispensed by an airless pump, comprising
    an external rigid body inside which a bag is provided formed of thermoplastic material having substantially the shape of an inner cavity of the rigid body, and also provided with a neck having a flange projecting radially from one end thereof,
    the neck, at that end opposite the end at which the flange is present, being connected to a lateral surface of the bag,
    said lateral surface comprising a closure bottom,
    the bag presenting, at least at a connection surface between the bag's neck and the bag's lateral surface, controlled deformation zones arranged to guide the bag deformation in accordance with preferential directions pertaining to preferential longitudinally axial planes,
    wherein at least a central portion of the lateral surface is free from said controlled deformation zones, wherein the closure bottom presents further controlled deformation zones arranged to guide the bag deformation in accordance with further preferential directions, wherein said controlled deformation zones or said further controlled deformation zones are defined by protuberances which project from the connection surface between said lateral surface and the neck, said preferential deformation planes passing external to said protuberances, wherein the controlled deformation zones are arranged on at least a portion of an external edge of the connection surface between the neck of the bag and the lateral surface of the bag.

2. A bag to be inserted into the interior of a rigid body to form a container for containing a substance to be dispensed by an airless pump, the bag formed of thermoplastic material having substantially the shape of the inner cavity of the rigid body, and also being provided with a neck having a flange projecting radially from one end thereof, the neck, at that end opposite the end at which the flange is present, being connected to a lateral surface of the bag, said lateral surface comprising a closure bottom, the bag presenting, at least at a connection surface between its neck and its lateral surface, controlled deformation zones arranged to guide the bag deformation in accordance with preferential directions pertaining to preferential longitudinally axial planes, wherein at least a central portion of the lateral surface is free from said controlled deformation zones, wherein the closure bottom presents further controlled deformation zones arranged to guide the bag deformation in accordance with further preferential directions, wherein said controlled deformation zones or said further controlled deformation zones are defined by protuberances which project from the connection surface between said lateral surface and the neck, said preferential deformation planes passing external to said protuberances, wherein the controlled deformation zones are arranged on at least a portion of an external edge of the connection surface between the neck of the bag and the lateral surface of the bag.

3. The container as claimed in claim 1, wherein said further preferential directions are coplanar with said preferential directions.

4. The container as claimed in claim 1, wherein said controlled deformation zones or said further controlled deformation zones are defined by variations in the connection radius of the connecting wall between said neck and said lateral surface, or between said bottom and said lateral surface, said preferential deformation planes containing the points of greater connection radius.

5. The container as claimed in claim 4, wherein said controlled deformation zones extend at most slightly beyond the connection surface between the shoulder and the lateral surface and said further controlled deformation zones extend at most slightly beyond the connection surface between the bottom and the lateral surface.

6. The container as claimed in claim 1, wherein said controlled deformation zones are defined by radial depressions incorporated into the connection surface between said lateral surface and the neck, said preferential deformation planes passing external to said depressions.

7. The container as claimed in claim 1, wherein the bag neck presents external grooves arranged to enable air to be vented and/or extracted during blow-moulding and operation of the bag inside the external body when associated with the airless pump, said grooves being formed by crests provided in the blow-moulding mould, said crests maintaining the bag in the desired position during its blow-moulding step.

8. The container as claimed in claim 1, said neck presents external grooves arranged to enable air to be vented and/or extracted during blow-moulding and operation of the bag inside the rigid body when associated with the airless pump.

9. The bag as claimed in claim 2, wherein said further preferential directions are coplanar with said preferential directions.

10. The bag as claimed in claim 2, wherein said controlled deformation zones or said further controlled deformation zones are defined by variations in the connection radius of the connecting wall between said neck and said lateral surface, or between said bottom and said lateral surface, said preferential deformation planes containing the points of greater connection radius.

11. The bag as claimed in claim 2, wherein said controlled deformation zones extend at most slightly beyond the connection surface between the shoulder and the lateral surface and said further controlled deformation zones extend at most slightly beyond the connection surface between the bottom and the lateral surface.

12. The bag as claimed in claim 2, wherein said controlled deformation zones are defined by radial depressions incorporated into the connection surface between said lateral surface and the neck, said preferential deformation planes passing external to said depressions.

13. The bag as claimed in claim 2, said neck presents external grooves arranged to enable air to be vented and/or extracted during blow-moulding and operation of the bag inside the rigid body when associated with the airless pump.

14. The container as claimed in claim 1, wherein said controlled deformation zones consist of zones defined by variations in the connection radius of the connecting wall between said neck and said lateral surface, and said further connection zones consist of zones between said bottom and said lateral surface, said preferential deformation longitudinally axial planes containing the points of greater connection radius.

15. The bag as claimed in claim 2, wherein said controlled deformation zones consist of zones defined by variations in the connection radius of the connecting wall between said neck and said lateral surface, and said further connection zones consist of zones between said bottom and said lateral surface, said preferential deformation longitudinally axial planes containing the points of greater connection radius.

16. A method for making the container of claim 1 for containing a substance to be dispensed by an airless pump, comprising the steps of:

a) preparing a substantially rigid external body, having a neck defining an access opening to an internal cavity of the body, b) and preparing a bag made of thermoplastic material having substantially the shape of the internal cavity of the rigid body, and provided with a neck having a flange projecting radially from one end thereof, the neck, at that end opposite the end at which the flange is present, being connected to a lateral surface of the bag, said lateral surface comprising a closure bottom, and c) sealedly coupling to the bag, via its neck, a probe arranged to withdraw the air contained in the bag interior and withdraw the air from the bag, hence causing a vacuum in the bag which causes the bag to contract, and d) while the bag is contracted, inserting the bag through the opening of the body until said flange abuts against a part of said body,
e) feeding into the bag at least one jet of air which inflates the bag to press the bag against the inner walls of the body, hence returning the bag to the bag's original shape which preceded the bag's contraction, and/or withdrawing the compressed air located between the bag and the walls defining an internal cavity of the rigid body,
the bag presenting, at least at a connection surface between the bag's neck and the bag's lateral surface, controlled deformation zones arranged to guide the bag deformation along preferential planes when the air is withdrawn, and before withdrawing the air contained in the bag interior, inserting the bag into a gripper located external to the container and provided with jaws which extend along said main planes, to at least partially deform the bag to guide the contraction process during air withdrawal.

17. The method as claimed in claim 16, wherein the bag when in the bag's contracted configuration is extracted from the gripper while maintaining the vacuum then, while still maintaining the vacuum, is inserted into the external body.

18. The method as claimed in claim 16, wherein said probe comprises a stem inserted into the bag at least during the air extraction and/or inflation operations, such that, at least when the bag is contracted, said stem maintains the bag elongated to guide the bag into the external body.

\* \* \* \* \*